United States Patent [19]

Konecny

[11] Patent Number: 4,647,802

[45] Date of Patent: Mar. 3, 1987

[54] VARIABLE RELUCTANCE MOTOR WITH REDUCED TORQUE RIPPLE

[75] Inventor: Karl F. Konecny, Los Altos, Calif.

[73] Assignee: Hewlett-Packard Company, Palo Alto, Calif.

[21] Appl. No.: 752,987

[22] Filed: Jun. 13, 1985

[51] Int. Cl.[4] ............................................. H02K 37/00
[52] U.S. Cl. .................................. 310/49 R; 310/162; 310/168
[58] Field of Search .................. 310/168, 49, 162–164, 310/190–193

[56] References Cited

U.S. PATENT DOCUMENTS

3,058,019 10/1962 Eisler .................................. 310/164
3,375,421 3/1968 Ve Nard ............................. 310/496
3,522,501 8/1970 Nyman ............................... 310/496
3,564,312 2/1971 Bunea ................................. 310/168

Primary Examiner—Donovan F. Duggan
Attorney, Agent, or Firm—James M. Williams

[57] ABSTRACT

A variable reluctance motor having tapered stator teeth and more rotor teeth than stator teeth. The width of the stator and rotor teeth provides a relatively high rotor tooth ratio and a relatively low stator tooth ratio. With this configuration the motor has very low torque ripple. Magnetic saturation is limited to the tips of the stator teeth, so the motor can be operated at current levels above the saturation point, producing a linear torque to current function and high output torque.

9 Claims, 12 Drawing Figures

VARIABLE RELUCTANCE MOTOR WITH REDUCED TORQUE RIPPLE

BACKGROUND OF THE INVENTION

Variable reluctance motors (VR motors) are typically used as step motors because they can produce rotation in small, discrete steps. This mode of operation is inherent in the nature of VR motors. VR motors have a multi-pole stator and a multi-pole rotor, with the separation between poles on the stator, the pitch, different from that on the rotor. The stator poles are electromagnetically excited in separate groups or phases and the rotor rotates until its poles reach a position of minimum magnetic reluctance relative to the excited stator poles. Upon energizing successive stator phases, the rotor turns a distance equal to the rotor pitch minus the stator pitch.

Other characteristics of variable reluctance motors including their low cost, small size and high torque to inertia ratio make VR motors attractive for use as general purpose servomotors. Their brushless construction makes VR motors particularly suitable for applications requiring spark-free operation.

However, two drawbacks have limited the use of variable reluctance motors as servomotors: torque ripple and an nonlinear torque to input current ratio (T/I). Torque ripple is the variation in maximum available output torque as the position of the rotor poles varies with respect to the stator poles. The nonlinear T/I ratio is inherent in the design of typical VR motors because they have no permanent magnets. Torque is created by the interaction of two magnetic fields, the rotor field and the stator field, both a function of current.

Efforts to overcome the torque ripple problem have had only limited success. One approach produces constant torque by modulating the current to the motor, limiting the current during the high torque part of the cycle. This has the consequent disadvantage of also limiting the maximum torque developed by the motor to a level which can be as much as 70% below peak torque.

Another, more successful technique is to energize more than one phase during those portions in the motor's rotation where the torque from the individual phases is near its minimum. This reduces the torque ripple significantly, i.e., to about 80% of peak torque, but it also requires a more complex commutator to control the energization of the stator phases, and is less effective at high current levels.

In the past, in order to optimize the torque characteristics of VR motors, the stator has been the determinative element in designing the motor. Stator design balanced magnetic flux leakage, caused by having too many teeth too close together, against minimum holding torque at the stable detent position, caused by having too few teeth. The, stator was designed with many teeth of uniform cross section, to provide the maximum practical area at the tips of the teeth for the magnetic flux, while maintaining sufficient intertooth space for the winding coils. The ratio of the width of the stator teeth to the width of the gap between the teeth, called the stator tooth ratio, was typically 1.0 or more. The rotor design was dependent on the stator design, with the number and width of the rotor teeth chosen to suit the geometry of the stator. This resulted in a rotor tooth ratio of about 0.5.

It has been the practice to avoid operating VR motors at current levels that would cause the stator teeth to become magnetically saturated. With many uniform poles, the VR motor could run close to the saturation point, without entering saturation where an increase in current would produce only a negligible increase in torque.

SUMMARY OF THE INVENTION

The present invention provides a VR motor which has very low torque ripple while maintaining a high peak torque, and produces a linear T/I ratio well suited for servomotor applications. This is accomplished by making the rotor rather than the stator the determinative element in the design and by incorporating a tapered stator tooth configuration. The rotor tooth width ratio rather than the stator tooth ratio is the basis for optimizing torque characteristics, resulting in a larger rotor tooth ratio of about 0.78 and a smaller stator tooth ratio of about 0.5. The stator has fewer teeth than the rotor, and the teeth are tapered so they are wider at the base than at the tip. Contrary to the conventional teaching of the VR motor art, the motor of the invention is designed to be run in saturation. However, due to the tapered shape of the stator teeth, only the tip portion of the tooth saturates. These characteristics provide a VR motor which produces high torque with very low torque ripple, and thus a relatively high maximum speed. Furthermore, when run in saturation the VR motor of the invention produces a linear T/I ratio, and torque increases with current up to the resistance heating limit of the motor windings.

DETAILED DESCRIPTION

Description of the Prior Art.

Figure 1:
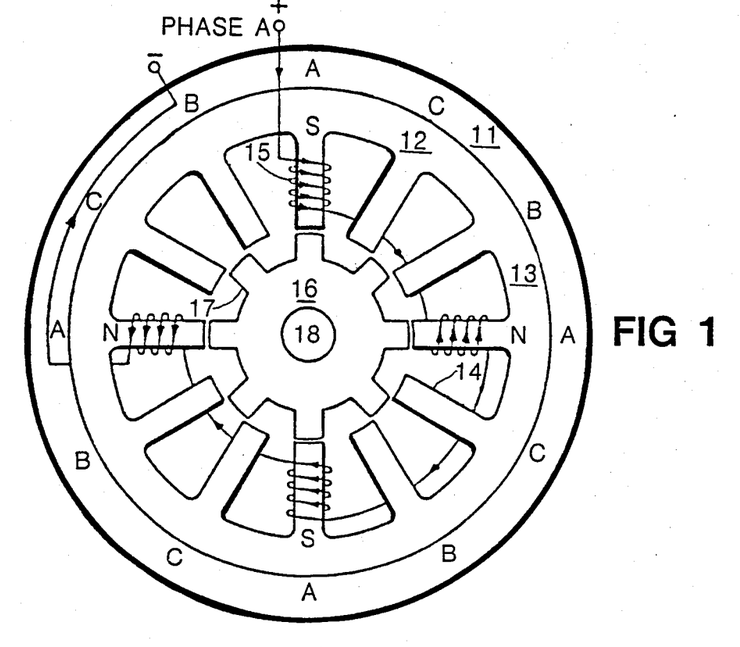
FIG. 1 is a schematic cross-sectional view of a conventional VR motor, illustrating the configuration of the rotor and the stator.

In order to understand the present invention, it is helpful to explain the design and operation of a conventional VR motor, illustrated in FIG. 1.

The motor depicted has 12 stator teeth and 8 rotor teeth, a typical design for producing 24 steps per revolution, with a fifteen degree change in rotor position upon each successive phase energization. The stator teeth are wound in three phases of four teeth each. For clarity and simplicity, the winding for only one phase is depicted.

Motor housing 11 encloses stator 12 which has an annular outer portion 3 and inwardly projecting teeth 14. Inside stator 12 is rotor 16, which is mounted concentrically with stator 12 on shaft 18. Rotor 16 has a central disc-shaped hub and outwardly projecting teeth 17. The three phases are labelled A, B and C around the periphery of stator 12, but only the windings 15 for the A phase are schematically depicted. In an actual motor, the windings 15 take up most of the space between adjacent stator teeth 14. Rotor 16 is shown in the stable position it takes when phase A is energized, with rotor teeth aligned with each of the four excited stator teeth, thus providing a minimum reluctance path for the magnetic flux produced in the excited stator teeth. Rotor 16 can be moved 15 degrees clockwise from the position shown by turning phase A off and turning phase B on. With phase B energized, the magnetic field produces a torque on the rotor, turning the rotor until its teeth are aligned with the four phase B stator teeth. Rotor 16 can be moved 15 degrees counterclockwise by turning phase A off and turning phase C on from the position shown. Continuous clockwise rotor motion can be produced by sequentially energizing the phases in the order A-B-C-A-B-C; and counterclockwise rotor motion can be produced by sequentially energizing the phases in the order A-C-B-A-C-B.

The stator teeth 14 have substantially uniform cross section, so that the base 14a is about the same width as the tip 14b. This provides a uniform flux density through the tooth so that magnetic saturation occurs throughout the tooth at about the same excitation current and magnetic field flux.

Magnetic flux considerations must be taken into account in designing other parameters of the rotor as well. The torque produced by the motor is a function of the total magnetic flux through the energized stator teeth. Thus, torque can be increased by using many stator teeth with several teeth energized for each phase. Torque can also be increased by using wider teeth which will carry a higher magnetic flux before reaching saturation. However, if the teeth become too wide and too close together, the magnetic flux leakage from the sides of the teeth begins to limit torque and to decrease efficiency. Traditionally, the balance is reached with a tooth configuration in which the stator tooth ratio is 1.0 or higher.

As described above, the rotor tooth configuration is determined from the stator tooth configuration. The tip 17b of the rotor tooth 16 is the same width as the tip 14b of the stator tooth 14. There are fewer rotor teeth than stator teeth to produce the required difference in tooth pitch for creating motive torque. Consequently the rotor tooth ratio is smaller than the stator tooth ratio. In the motor shown in FIG. 1, the rotor tooth ratio is about 0.5, again typical for conventional VR motors.

Description of the Preferred Embodiment

Figure 2:
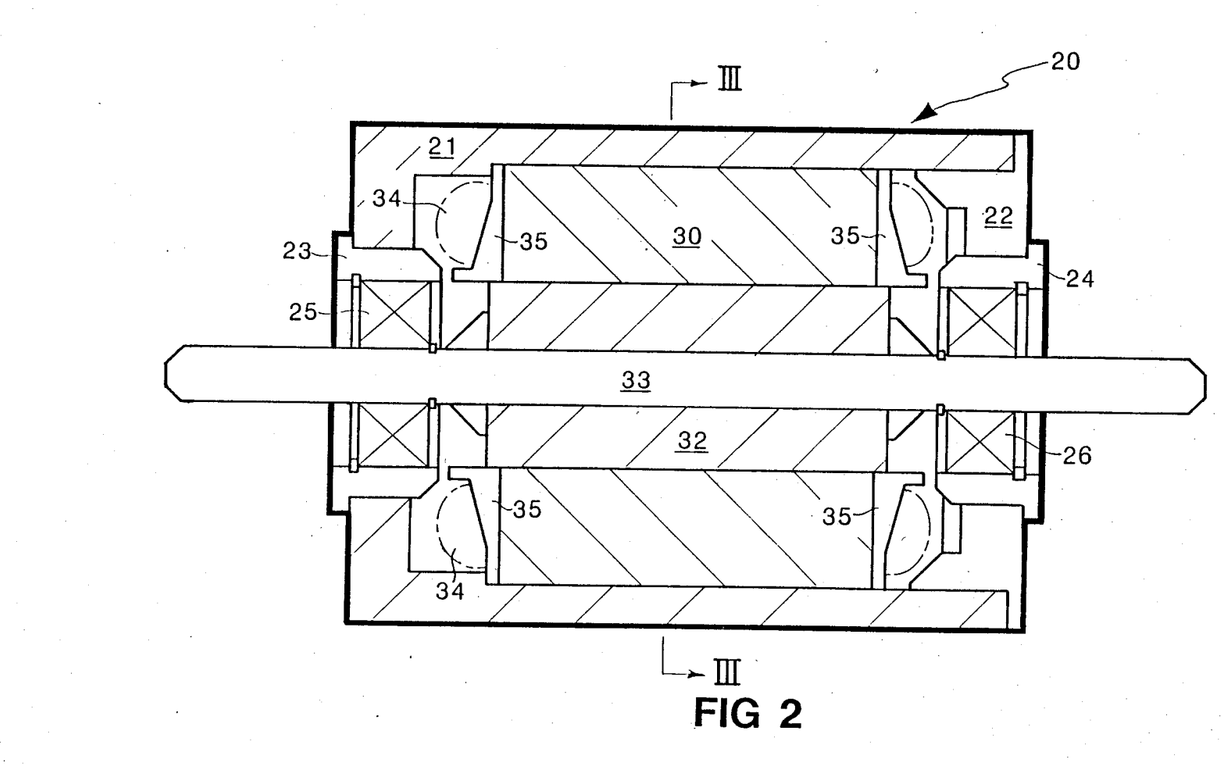
FIG. 2 is a simplified side view of a variable reluctance motor which embodies the present invention.
Figure 3:
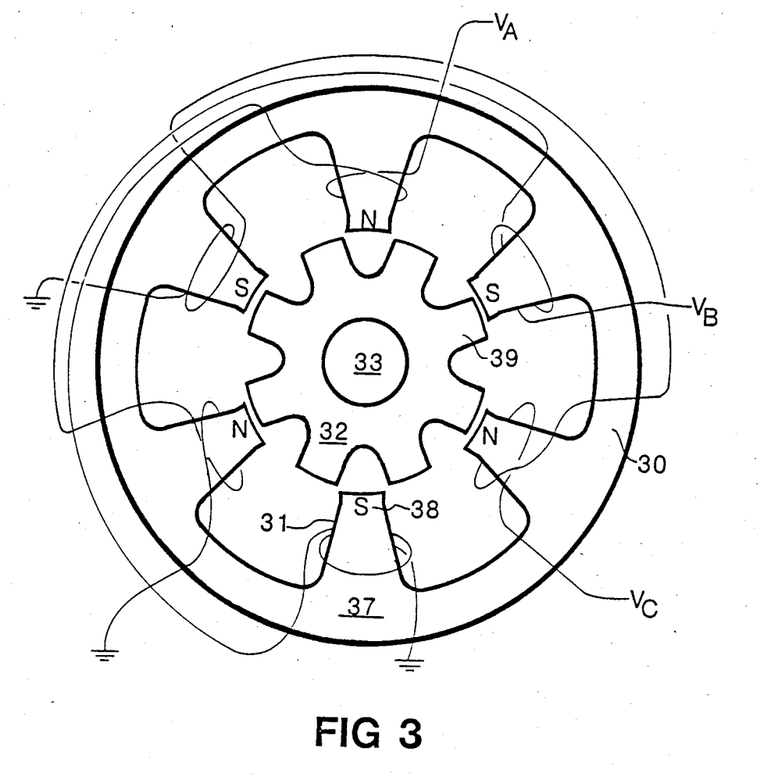
FIG. 3 is a simplified cross-sectional view of the motor depicted in FIG. 2, showing the configuration of the rotor and the stator.

A variable reluctance motor which embodies the present invention is illustrated in FIGS. 2 and 3. FIG. 2 is a side view of the motor and FIG. 3 is a simplified cross-sectional view showing the configuration of the rotor and the stator. Referring to FIG. 2, motor 20 has an outer housing 21 and an end bell 22 which enclose the motor and support journals 23 and which hold bearings 25 and 26 at each end thereof. Stator 30 is mounted inside housing 21. Rotor 32 is attached to shaft 33 which is mounted through bearings 25 and 26 for rotation concentric to stator 30. Stator 30 has a plurality of teeth 31 and each of the teeth is wrapped with windings 34. Winding keepers 35 are located at each end of each of the stator teeth 31 beneath the windings. The tapered body of winding keepers 35 compensates for the tapered cross-section of stator teeth 31, making it easier to wind the windings onto the stator teeth and preventing the windings from slipping off the tapered stator teeth. Winding keepers 35 are made from nonmagnetic material so that they do not affect the electromagnetic response of stator teeth 31.

The configuration of the rotor and stator teeth and the cross-sectional shape of the stator teeth are more easily understood by referring to FIG. 3, which is a schematic view of rotor 32 and stator 30 along the axis of motor shaft 33. FIG. 3 also shows windings 34 schematically, for clarity.

An important aspect of the invention is that the geometry of the rotor is the determinative element of the design, and the stator must be designed within the constraints imposed by the rotor geometry. Also, the rotor tooth ratio is in the range of 0.75 to 0.90, higher than that customary in the past.

Rotor 32 has a disc shaped hub attached to shaft 18 and eight teeth 39 which project outwardly from the hub. Rotor teeth 39 are equally spaced around the circumference of the rotor. The width of rotor teeth 39 is such that the ratio of the width of the rotor teeth to the width of the space between the teeth is about 0.78. Rotor 32 is constructed of laminated layers of transformer iron, instead of low carbon steel used in conventional motors. The laminated structure minimizes eddy current losses, thus the motor produces higher torque at higher speeds.

Stator 30 has an annular outer portion 36 and six teeth 31 which project inwardly from annular portion 36. Each tooth 31 is tapered from a relatively wide base 37 where it meets the annular portion 36 to a narrower tip 38 nearer the center of the motor and in close proximity to rotor 32. The width of the tip 38 is made the same as the width of rotor teeth 39. This can be done without overcrowding the stator teeth, even though the rotor teeth are wider than usual, because the number of stator teeth is greatly reduced. Thus, although the stator teeth are also wider than usual, because there are 6 teeth rather than 12, the stator tooth ratio is about 0.5, well below the value at which flux leakage becomes a problem.

The tapered cross section of the stator teeth also contributes to the improved performance of the motor. The tip 38 of the tooth becomes magnetically saturated at a lower magnetic flux than the rest of the tooth because the tip has a smaller cross sectional area.

Figure 4:
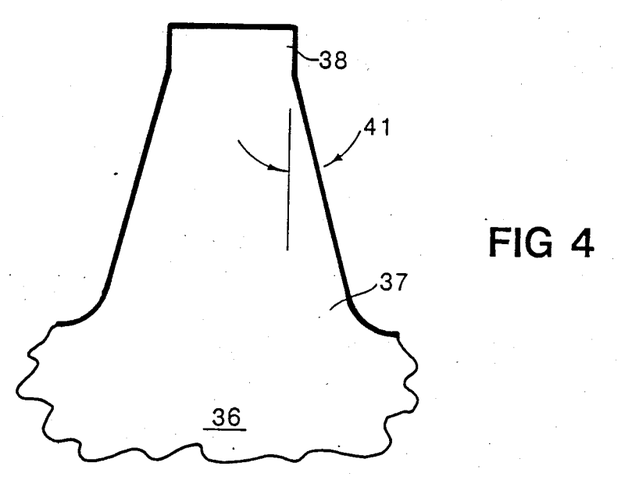
FIG. 4 shows a more detailed view of one of the teeth of the stator depicted in FIG. 3.
Figure 5A:
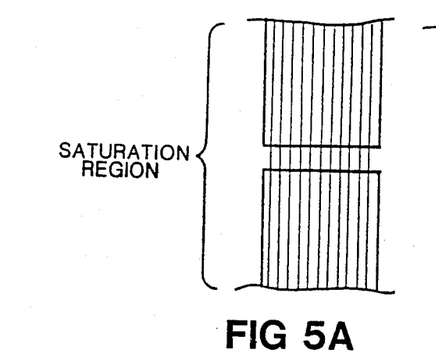
FIGS. 5A, 5B, 5C and 5D illustrate the magnetic flux patterns in tapered and nontapered teeth, when the teeth are aligned and when the teeth are out of alignment.
Figure 5B:
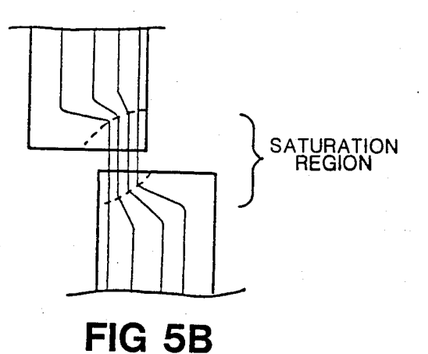
Figure 5C:
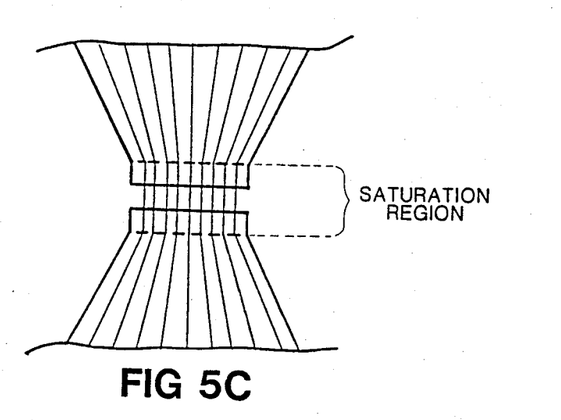
Figure 5D:
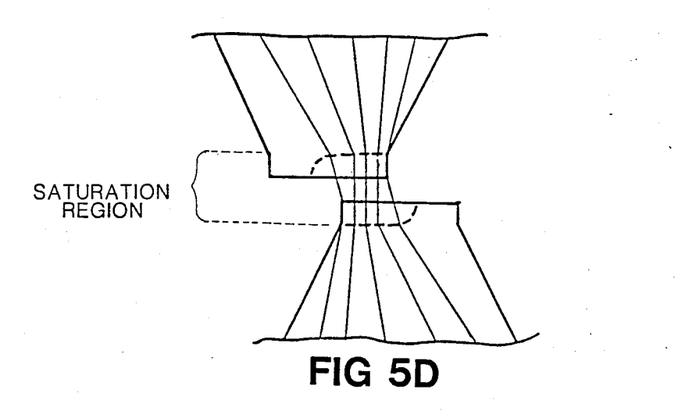

FIG. 4 shows a more detailed view of one of the stator teeth. Tip 38 includes a small untapered portion. This portion establishes a limit for the region in which saturation occurs, which is important in linearizing the dependence of torque on current. The untapered portion is also advantageous if the inside diameter of the stator is to be machined to match the outside diameter of the rotor, providing a small section of uniform width so that the tip width remains the same after a small amount is removed. Both sides of the tooth are tapered out below the tip section. The taper angle 41 is such that the base of the tooth is about twice as wide as the tip. With such a configuration, when the tip is saturated the flux density at the base is about half the saturation value, a level that provides low reluctance. The taper angle in the illustrated embodiment is 15 degrees, which has been found to provide good results for the motor configuration shown.

FIG. 5 illustrates the magnetic flux patterns in tapered and untapered stator teeth. FIGS. 5A and 5B show untapered conventional teeth, while FIGS. 5C and 5D show the tapered teeth of the present invention. When untapered teeth are in alignment, as in FIG. 5A, the teeth become magnetically saturated along their entire length, and the large regions of saturation give rise to a large magnetic reluctance in the tooth. When the teeth are out of alignment, as in FIG. 5B, the regions of saturation are limited to the areas near the aligned corners and the magnetic reluctance in the tooth is smaller. Thus saturation occurs at a low current value when the teeth are aligned and at a high current value when the teeth are out of alignment.

In contrast, for the tapered tooth geometry of the present invention, the length of the saturated region and thus the magnetic reluctance in the tooth is nearly constant and is independent of tooth alignment. The region of saturation is confined to the small untapered tip portion both when the teeth are aligned, as in FIG. 5C, and when they are out of alignment, as in FIG. 5D. Thus, the contribution of the reluctance in the teeth to the reluctance of the magnetic circuit is a constant, rather than a complex function of position as in conventional VR motors. The torque is proportional to the derivative of reluctance with respect to rotor position. Since the reluctance of the teeth is constant, in the VR motor of the invention, that factor does not contribute to nonlinearities in the torque function.

Figure 6:
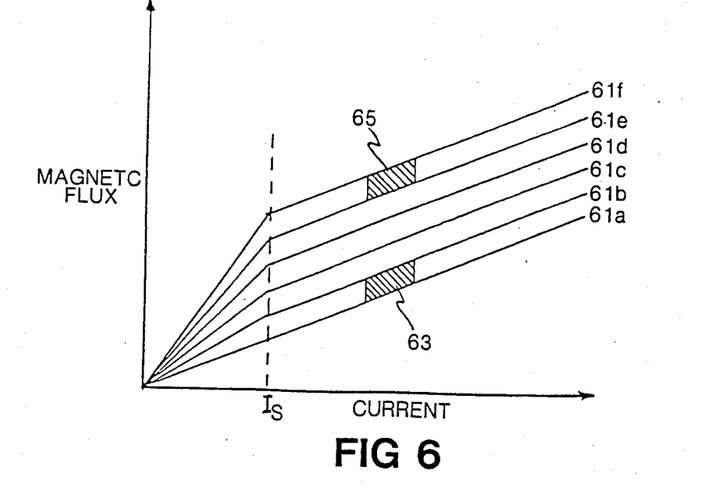
FIG. 6 is a graph illustrating the magnetic flux versus winding current function at various rotor positions for a motor constructed in accordance with the invention.

The relationship between the winding current and the magnetic flux for a VR motor constructed according to the invention is illustrated in FIG. 6. The flux to current function is represented by the family of curves 61a, b, c, d, e and f, for the range of rotor positions from the unstable detent position, curve 61a, to the stable detent position, curve 61f. The saturation point for all of the curves is at the same current value, $I_s$, because the reluctance of the rotor/stator magnetic circuit is independent of rotor position. At current values larger than $I_s$, magnetic flux continues to increase as current increases. The area of shaded regions 63 and 65 is proportional to the torque the motor produces with a small increase in current. During saturation, the incremental magnetic inductance, which is the slope of curves 61a to f, is constant, and thus torque is a linear function of current.

Figure 7A:
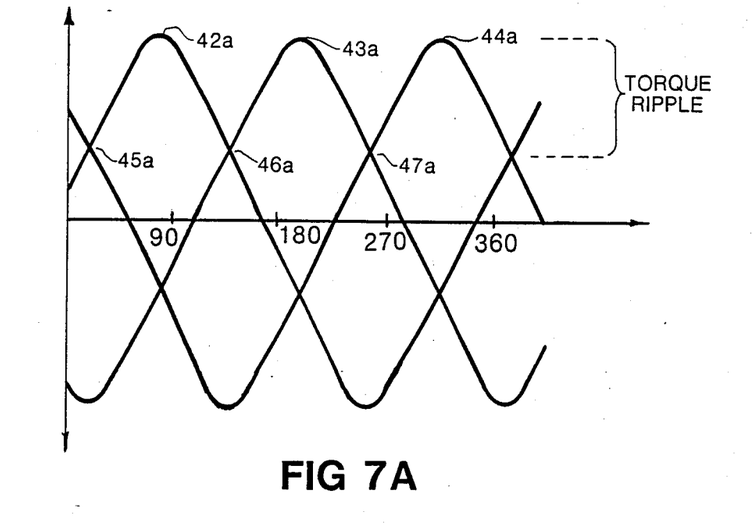
FIG. 7A is a graph illustrating the torque versus rotor position function for a typical conventional VR motor.
Figure 7B:
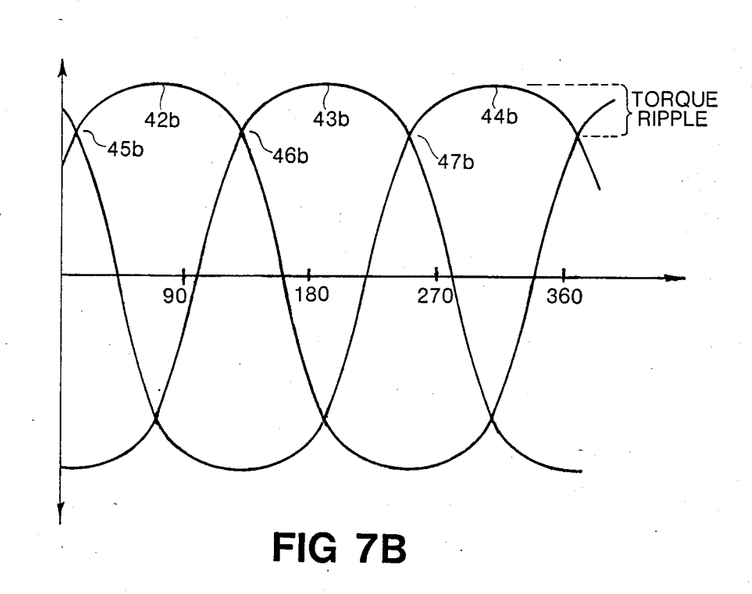
FIG. 7B is a graph illustrating the torque versus rotor position function for a VR motor constructed according to the present invention, such as the one depicted in FIGS. 2, 3 and 4.
Figure 8:
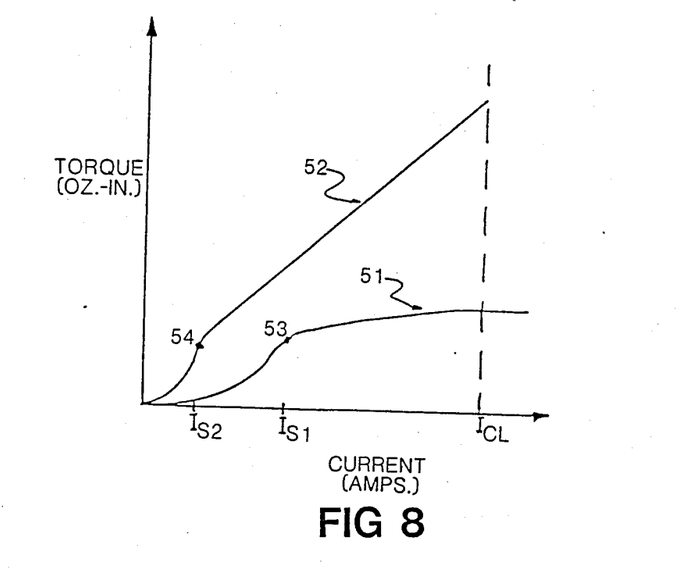
FIG. 8 is a graph comparing the torque to current (T/I) function for a conventional VR motor and the T/I function for a VR motor constructed according to the present invention.

The performance of the motor depicted in FIGS. 2, 3 and 4, is further illustrated in FIGS. 7A, 7B and 8.

FIG. 7A shows the torque versus rotor position function for a typical conventional VR motor. Each of the three phases has a characteristic sinusoidally shaped curve for torque versus rotor position and the overlapping set of three curves gives the torque relationship for the motor as a whole. The torque curves for each phase show high torque peaks 42a, 43a and 44a, separated by low torque valleys 45a, 46a and 47a where the torque curves cross. The torque ripple is the difference between the torque at the peaks and the torque in the valleys. As shown in FIG. 7A, torque ripple can be significant in conventional VR motors. This can severly degrade the motor's performance when driving a heavy load at low speed.

FIG. 7B shows the corresponding torque versus rotor position function for a motor constructed according to the present invention, such as the one depicted in FIGS. 2, 3 and 4. Note that the high torque peaks 42b, 43b and 44b for each phase are broader than those for the conventional VR motor. The low torque valleys 42b, 43b and 44b are not nearly as low because of the increased overlap of the torque curves for the individual phases. This results in significantly reduced torque ripple and improved performance.

FIG. 8 shows a comparison between the torque to current (T/I) function 51 for a conventional VR motor and the T/I function 52 for a VR motor constructed according to the present invention. In the conventional VR motor, the torque increases until the current reaches the value $I_{s1}$ at which the stator teeth become magnetically saturated, at point 53. At higher current levels, the torque remains nearly constant. Below the saturation level, the torque to current relationship is nonlinear. For the motor of the present invention, the torque continues to increase as the current increases past the value $I_{s2}$ at which the tips of the stator teeth become magnetically saturated, at point 54. Above the saturation point, torque becomes a linear function of current and continues to rise with increasing current up to the resistance heating limit of the motor's windings, $I_{CL}$.

In contrast to conventional VR motors which are generally limited to operation at current levels below the saturation point, the motor of the present invention can be advantageously operated above the saturation point. In fact, in this region, the motor has a linear torque to current function which is ideally suited for servo-controlled operation. The motor is designed to operate primarily above the saturation point. Here again, the configuration of the stator is helpful. The increased space between the stator teeth permits an increased number of turns to be wound on the stator teeth. This causes saturation to occur at a relatively low current value, as shown in FIG. 8. As a result, the linear part of the T/I curve begins at a low current level and relatively high torque can be achieved to produce higher speeds than those which can be achieved in conventional VR motors.

It will be understood by those of skill in the art of VR motor design that the number of stator teeth and rotor teeth can be chosen according to the desired application. The present invention can be practiced with a wide range of combinations of rotor teeth and stator teeth so long as the stator tooth ratio and rotor tooth ratio are maintained within the limits outlined above, and the number of rotor teeth is greater than the number of stator teeth.

I claim:

1. A variable reluctance motor with low torque ripple, suitable for operation as a servomotor, comprising:
    a stator having a body and a plurality of tapered teeth projecting from the body, each of said teeth having a base where the tooth is connected to the body and a tip narrower than the base;
    a rotor having a plurality of teeth and mounted for motion relative to the stator; and
    means for electromagnetically exciting the stator teeth in phased sets to provide magnetic motive force to the rotor;

wherein the rotor teeth and the stator teeth are equally spaced and the rotor tooth ratio is larger than the stator tooth ratio, with the ratio of the width of the tip of a rotor tooth to the width of the gap between the rotor teeth in the range from 0.75 to 0.90; and the width of the tip of a stator tooth is substantially the same as the width of the tip of a rotor tooth, with the ratio of the width of the tip of a stator tooth to the width of the gap between stator teeth in the range from 0.50 to 0.55.

2. The motor of claim 1 wherein the electromagnetic exciting means produces sufficient magnetic flux in the stator teeth to drive the tips of the stator teeth into magnetic saturation, producing a substantially linear torque to current function.

3. A variable reluctance motor with low torque ripple, suitable for operation as a servomotor, comprising:
a fixed stator having an annular body and a plurality of teeth projecting inwardly from the body, each of said teeth tapering from a base where the tooth is connected to the stator body to a tip narrower than the base;
a rotor mounted concentric with the stator for rotary motion relative to the stator, having a disc-shaped body and a plurality of teeth projecting outwardly from the rotor body toward the teeth of the stator; and
means for electromagnetically exciting the stator teeth in phased sets to provide magnetic motive force to the rotor;
wherein the number of said rotor teeth is smaller than the number of said rotor teeth;
the rotor teeth and the stator teeth are equally spaced and the rotor tooth ratio is larger than the stator tooth ratio, with the ratio of the width of the tip of a rotor tooth to the width of the gap between the rotor teeth in the range from 0.75 to 0.90; and the width of the tip of a stator tooth is substantially the same as the width of the tip of a rotor tooth, with the ratio of the width of the tip of a stator tooth to the width of the gap between stator teeth in the range from 0.50 to 0.55.

4. The motor of claim 3 the stator has six equally spaced teeth and the rotor has eight equally spaced teeth.

5. The motor of claim 4 wherein the six stator teeth are excited in three phases, with two diametrically opposite teeth excited with magnetic fields of opposite polarity in each of the phases.

6. The motor of claim 3 wherein the electromagnetic exciting means produces sufficient magnetic flux in the stator teeth to drive the tips of the stator teeth into magnetic saturation, producing a substantially linear torque to current function.

7. The motor of claim 6 wherein the tip of each stator tooth has a short untapered portion, and the region of magnetic saturation is confined to the untapered portion of the tooth.

8. The motor of claim 3 wherein the rotor is of laminated construction.

9. The motor of claim 3 wherein the taper angle for the stator teeth is such that the width of the base of the tooth is about twice the width of the tip of the tooth.

* * * * *